(No Model.)
R. L. LYNCH.
INSECT DESTROYER.
No. 571,925. Patented Nov. 24, 1896.
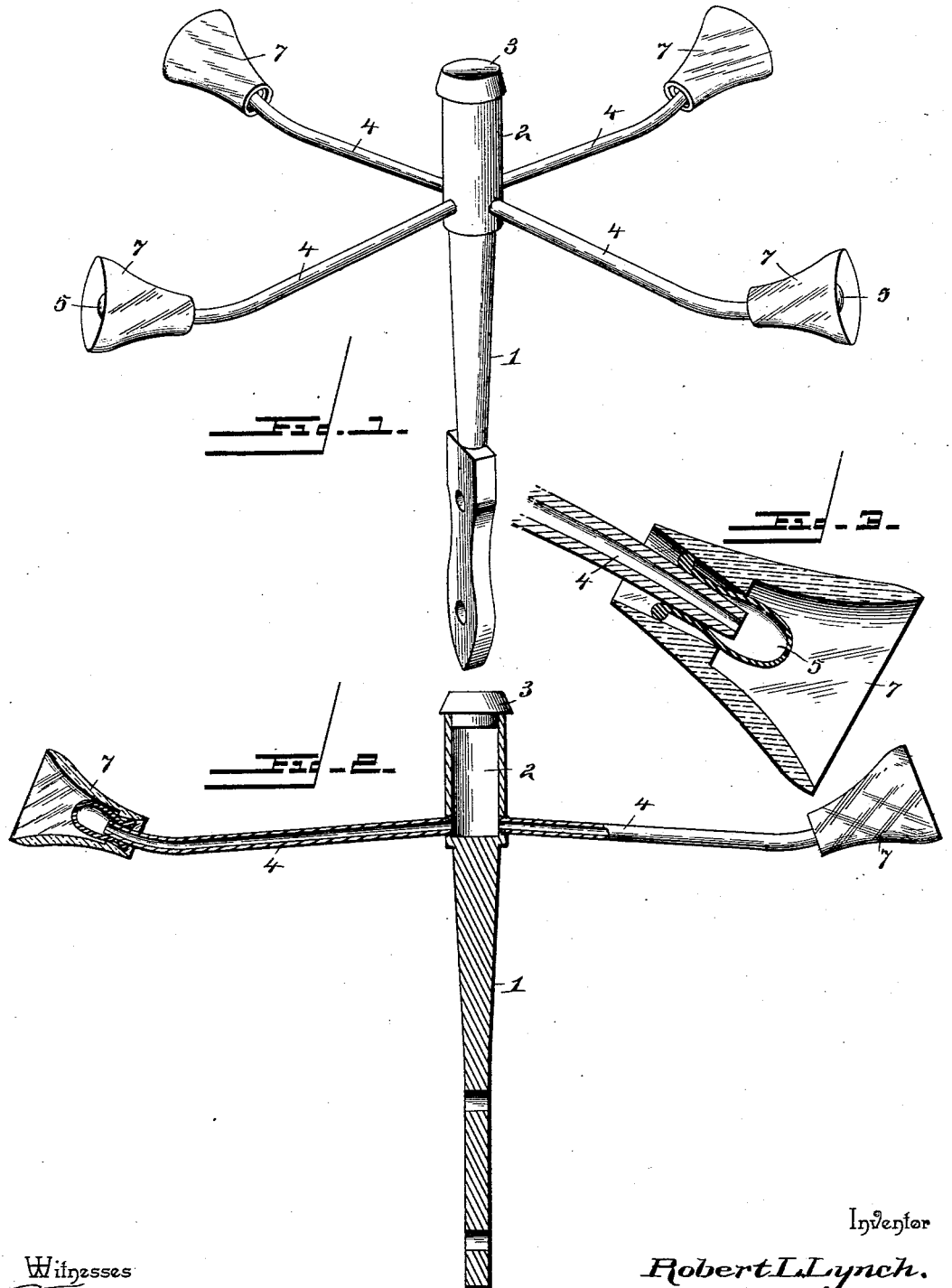
Witnesses
F. N. Riley.
H. F. Riley.
Inventor
Robert L. Lynch.
By his Attorneys,
C. A. Snow & Co.

UNITED STATES PATENT OFFICE.

ROBERT L. LYNCH, OF LEEPORT, KENTUCKY.

INSECT-DESTROYER.

SPECIFICATION forming part of Letters Patent No. 571,925, dated November 24, 1896.

Application filed October 3, 1895. Serial No. 564,516. (No model.)

*To all whom it may concern:*

Be it known that I, ROBERT L. LYNCH, a citizen of the United States, residing at Leeport, in the county of Trimble and State of Kentucky, have invented a new and useful Insect-Destroyer, of which the following is a specification.

This invention relates to improvements in insect-destroyers.

The object of the present invention is to provide a simple and inexpensive device adapted for destroying the tobacco-fly and capable of automatically distributing an insecticide.

The invention consists in the construction and novel combination and arrangement of parts hereinafter fully described, illustrated in the accompanying drawings, and pointed out in the claims hereto appended.

In the drawings, Figure 1 is a perspective view of an insect-destroyer constructed in accordance with this invention. Fig. 2 is a vertical sectional view. Fig. 3 is an enlarged detail sectional view of the outer end of one of the radial arms, illustrating the construction of the artificial flower.

Like numerals of reference designate corresponding parts in all the figures of the drawings.

1 designates a standard or shank provided at its lower portion with perforations and adapted to be bolted or otherwise secured to a stake or to be stuck in the ground or otherwise secured in an upright position. The top of the standard or shank is enlarged at its collar or tubular to form a receptacle 2, and the upper end of the tubular portion is normally closed by a removable stopper or cover 3.

The insecticide to be distributed is placed in the receptacle 2 and passes through tubular radial arms 4, extending outward from the standard or shank and communicating with the interior of the receptacle. The outer ends of the radial arms, which are slightly bowed upward, are provided with elastic bulbs or tips 5, and have arranged on them conical shells 7, constructed of glass or other suitable material and forming an artificial flower resembling that of the jimson-plant. The elastic tip or bulb is concealed within the shell 7 and is provided with an orifice through which the insect-poison escapes, and the tobacco-flies entering the artificial flowers obtain the poison and are destroyed.

It will be seen that the device is exceedingly simple and inexpensive in construction, that it is capable of automatically distributing the insecticide, and that the artificial flowers are adapted to decoy the insects into taking the poison.

Changes in the form, proportion, and minor details of construction may be resorted to without departing from the principle or sacrificing any advantages of the invention.

What I claim is—

1. An insect-destroyer, comprising a supporting stem or standard provided at its top with an insecticide-receptacle and having a removable cover or cap, radially-disposed tubular arms extending outward from the upper portion of the stem or standard and communicating with the receptacle, and artificial flowers detachably mounted on the outer ends of the arms, substantially as and for the purpose described.

2. An insect-destroyer, comprising a supporting stem or standard provided at its top with an insecticide-receptacle and having a removable cover or cap, radially-disposed tubular arms extending outward from the upper portion of the stem or standard and communicating with the receptacle, elastic tips arranged on the outer ends of the arms and having discharge-orifices, and the removable tapering shells mounted on the outer ends of the arms and secured thereto by the elastic tips and receiving the same, substantially as and for the purpose described.

In testimony that I claim the foregoing as my own I have hereto affixed my signature in the presence of two witnesses.

ROBERT L. LYNCH.

Witnesses:
 J. H. MCKINNEY,
 J. A. VORIES.